(12) United States Patent
Savry et al.

(10) Patent No.: US 6,891,503 B1
(45) Date of Patent: May 10, 2005

(54) BOLOMETRIC DETECTOR WITH ANTENNA COMPRISING A SWITCH AND IMAGERY DEVICE COMPRISING SAME

(75) Inventors: Olivier Savry, Grenoble (FR); Patrick Agnese, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 31 days.

(21) Appl. No.: 10/670,376

(22) Filed: Sep. 26, 2003

(30) Foreign Application Priority Data

Oct. 1, 2002 (FR) .............................................. 02 12129

(51) Int. Cl.⁷ ............................ H01L 27/18; H01Q 1/38
(52) U.S. Cl. ................................ 343/700 MS; 343/703; 343/879; 343/893; 343/718; 343/720; 343/721; 250/338.1; 250/338.4; 250/336.1; 250/349
(58) Field of Search ........................ 343/700 MS, 703, 343/720, 721, 718, 893, 913; 250/338.1, 338.4, 336.1, 349, 370.01

(56) References Cited

U.S. PATENT DOCUMENTS

| | | | | |
|---|---|---|---|---|
| 5,825,029 A | * | 10/1998 | Agnese et al. ............ | 250/338.1 |
| 6,028,312 A | | 2/2000 | Wadsworth et al. ......... | 250/351 |
| 6,292,140 B1 | * | 9/2001 | Osterman ............ | 343/700 MS |
| 6,316,770 B1 | * | 11/2001 | Ouvrier-Buffet et al. | 250/338.1 |
| 6,329,655 B1 | * | 12/2001 | Jack et al. ................ | 250/338.1 |
| 6,369,772 B1 | * | 4/2002 | Forster ......................... | 343/850 |
| 6,456,225 B1 | * | 9/2002 | Forster ......................... | 342/12 |

FOREIGN PATENT DOCUMENTS

| | | |
|---|---|---|
| FR | 2 788 129 | 7/2000 |
| FR | 2 818 795 | 6/2002 |
| WO | WO 93/25877 | 12/1993 |

OTHER PUBLICATIONS

Osterman et al, "Antenna–coupled bolometer with a micro-machined–beam thermal link," Applied Physics Letters, American Institute of Physics, vol. 71, No. 16, pp. 2361–2363, Oct. 20, 1997.

* cited by examiner

*Primary Examiner*—Don Wong
*Assistant Examiner*—Chuc Tran
(74) *Attorney, Agent, or Firm*—Oliff & Berridge, PLC

(57) ABSTRACT

The bolometric detector comprises at least one receiver antenna designed to collect electromagnetic waves. The antenna is extended by a resistive load converting the power from the electromagnetic waves into calorific power. Said resistive load is in contact with a thermometric element detecting the temperature rise relating to the calorific power generated. A switch arranged between the antenna and the resistive load enables the current flow between the antenna and the resistive load to be modulated by means of control means. The switch can for example be a micro-device with a bimetal effect thermal actuator.

11 Claims, 5 Drawing Sheets

BOLOMETRIC DETECTOR WITH ANTENNA COMPRISING A SWITCH AND IMAGERY DEVICE COMPRISING SAME

BACKGROUND OF THE INVENTION

The invention relates to a bolometric detector comprising at least one receiver antenna designed to collect electromagnetic waves and extended by a resistive load converting the power of the electromagnetic waves into calorific power, said resistive load being in contact with a thermometric element detecting the temperature rise relating to the calorific power generated, said detector also comprising modulating means.

STATE OF THE PRIOR ART

Antenna-based bolometric detectors are generally used to achieve cameras or imagery systems able to passively detect sub-millimeter and millimeter wavelengths. This range of wavelengths enables objects to be detected under difficult conditions such as in the dark, fog, rain, or smoke. Thus the document FR-A1-2,788,129 corresponding to WO-A1-0040937 describes a bolometric detector with antenna comprising a resistive load that creates a calorific power when the antenna detects a millimeter electromagnetic wave, the resistive load being the load resistor of the antenna.

This type of detector generally generates a large low frequency noise at the output of a thermometric element designed to measure the temperature increase. The low frequency noise generated can be limited by applying absorption modulation at the incident wave. The electrical signal detected is then translated to higher frequencies, which has the consequence of making the thermometric element and the system located down-line from the detector, such as an electronic processing circuit, work in a frequency range where they are less noisy.

To achieve this modulation, it is known to use a chopper enabling the incident wave absorbed by the detectors of an imagery system to be modulated. The chopper is formed by a wheel comprising periodic openings, the wheel being driven by a motor the frequency of rotation whereof is the frequency at which the response of the detectors is translated, thus limiting the low frequency noise. It does however present numerous shortcomings, such as that of generating mechanical vibrations, of being bulky and of presenting a fluctuating speed of rotation of the motor.

OBJECT OF THE INVENTION

The object of the invention is to provide an antenna-based bolometric detector enabling modulation so as to limit low frequency noise, the modulating means having to be of small size, dependable and vibration-free.

According to the invention, this object is achieved by the fact that the modulating means comprise a switch located between the antenna and the resistive load, control means periodically causing opening and closing of the switch at a preset switching frequency.

According to a development of the invention, the control means comprise thermal switching means.

According to another feature of the invention, the thermal switching means comprise a bimetal effect thermal actuator.

According to a preferred embodiment, the switch achieved on a substrate comprises a deformable element, attached via its two ends to the substrate and naturally convex with respect to the latter, a conducting stud, located on the deformable element, being designed to make the electrical contact between the antenna and the resistive load when the switch is closed, the antenna and resistive load being achieved on said substrate.

A further object of the invention is to provide an imagery device comprising at least one such bolometric detector.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

The bolometric detector is achieved by means of technologies used in the semiconductor field. It is achieved on a substrate, preferably made of silicon.

Figure 1:
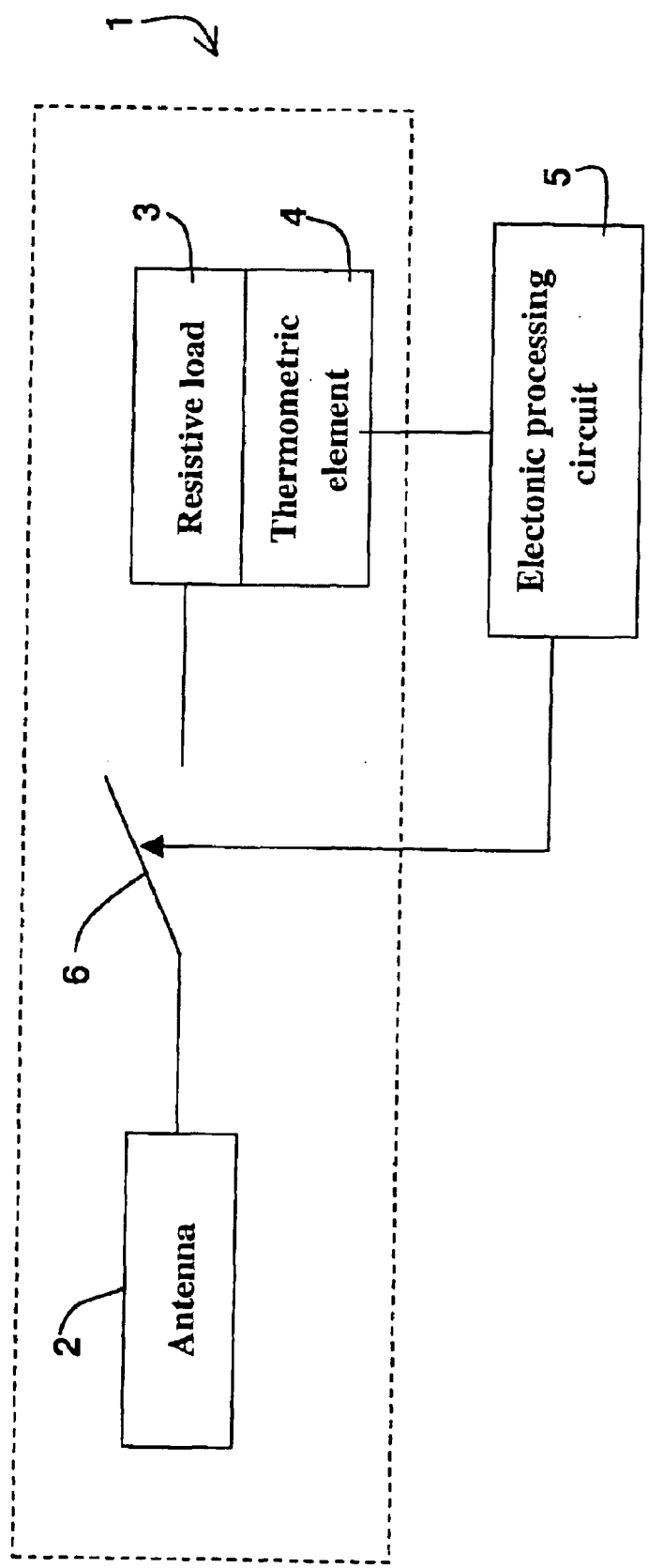
FIG. 1 represents a detector according to the invention in block diagram form.

In FIG. 1, a bolometric detector with antenna 1, represented by a broken line in FIG. 1, comprises at least one flat metallic receiver antenna 2 designed to collect electromagnetic waves, thus creating an electrical signal corresponding to the electromagnetic power detected. The antenna 2 is connected to a resistive load 3 converting the electromagnetic power into calorific power. The current flowing from the antenna 2 to the resistive load 3 creates a temperature rise of the latter by Joule effect corresponding to a calorific power given off by the resistive load.

The resistive load 2 is in contact with a thermometric element 4, enabling the calorific power to also dissipate in the thermometric element 4. The thermometric element 4, preferably formed by a diode, is designed to convert the temperature increase due to its heat rise into a current or voltage variation. Thus, if no electromagnetic waves are detected, a reference current flows through the thermometric element 4, the reference current corresponding to the temperature of the thermometric element 4 in the absence of heating.

When an electromagnetic wave is detected, the thermometric element 4 heats and the current flowing therethrough differs from the reference current. An electronic processing circuit 5 connected to the thermometric element 4 detects and analyses the variation of the current flowing through the thermometric element 4 and therefore the temperature variation due to the heat rise of the thermometric element 4.

The bolometric detector 1 comprises a switch 6 arranged between the antenna 2 and the resistive load 3. Control means periodically cause opening and closing of the switch 6 at a preset switching frequency. When the switch is closed, the electric current generated by the detected electromagnetic waves flows from the antenna to the resistive load. The control means can be of any known type and comprise switching means which can be for example electrostatic, thermal or electromagnetic, and which are controlled by the electronic processing circuit 5 (FIG. 1).

The periodical opening and closing of the switch 6 enables the electrical signal transmitted to the resistive load 3 to be modulated in amplitude so as to limit the low frequency noise received by a device located down-line from the detector, such as the electronic processing circuit 5. The switching frequency of the switch is lower than the thermal cut-off frequency of the detector. A thermal variation occurring at a frequency higher than the thermal cut-off frequency of the detector can not in fact be detected. The thermal cut-off frequency is equal to the ratio C/R, C being the heating capacity of the thermometric element and R the thermal resistance of the resistive load. The switching frequency of the switch 6 is preferably about a few tens to a few hundred Hertz.

Figure 2:
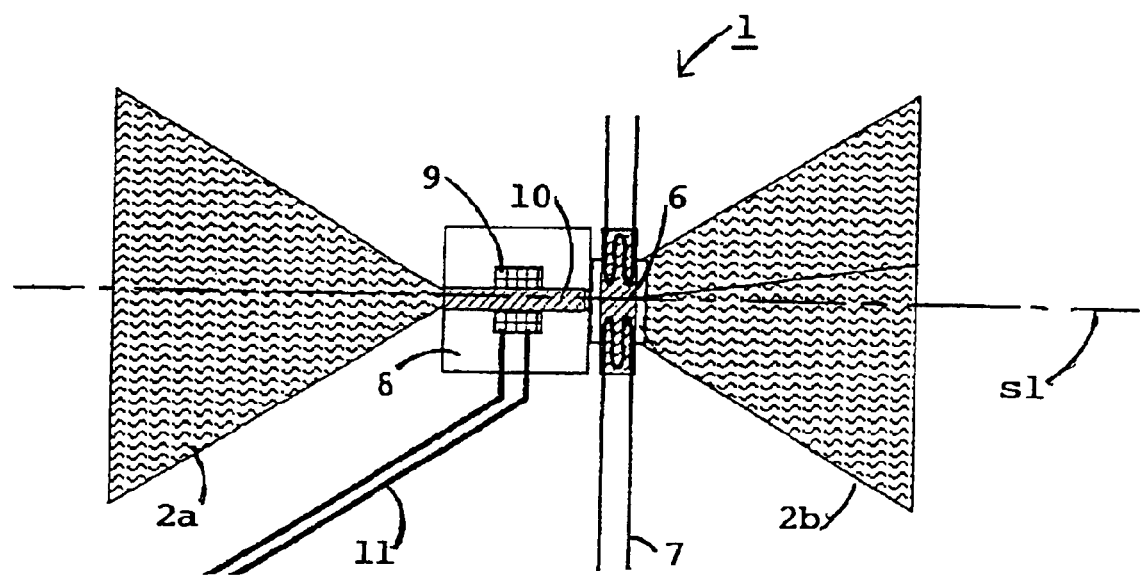
FIG. 2 illustrates a particular embodiment of a detector according to the invention.

According to a particular embodiment represented in FIG. 2, the bolometric detector 1, achieved on a silicon substrate (not shown in FIG. 2), comprises two opposite flat metallic elements corresponding to a first and a second receiver antenna 2a and 2b, triangular in FIG. 2. They are arranged on each side of a hollow central part 8, along an axis of symmetry s1.

An arm 10, preferably made of metal, in the form of a beam constituting the resistive load of the detector, is suspended above the hollow central part 8 along the axis s1. It comprises a first end directly connected to the first antenna 2a and a second end connected to the second antenna 2b by means of a switch 6. Electrodes 7 connect the switch 6 to the electronic processing circuit 5 which periodically causes opening and closing of the switch 6 so as to modulate the electrical signal generated by the antennas before the latter is input to the resistive load.

A diode 9 is fitted on the arm 10, above the hollow central part 8, in thermal contact with the resistive load constituted by the arm 10. Thus, when the arm 10 receives the electrical signal corresponding to the detected wave, it heats and this heat rise is transmitted to the diode 9, causing a current or voltage variation in the diode 9. The diode 9 is connected to terminals 11 connecting it to the electronic processing circuit 5, which measures and analyses the current or voltage variation generated by the heat rise.

Figure 3:
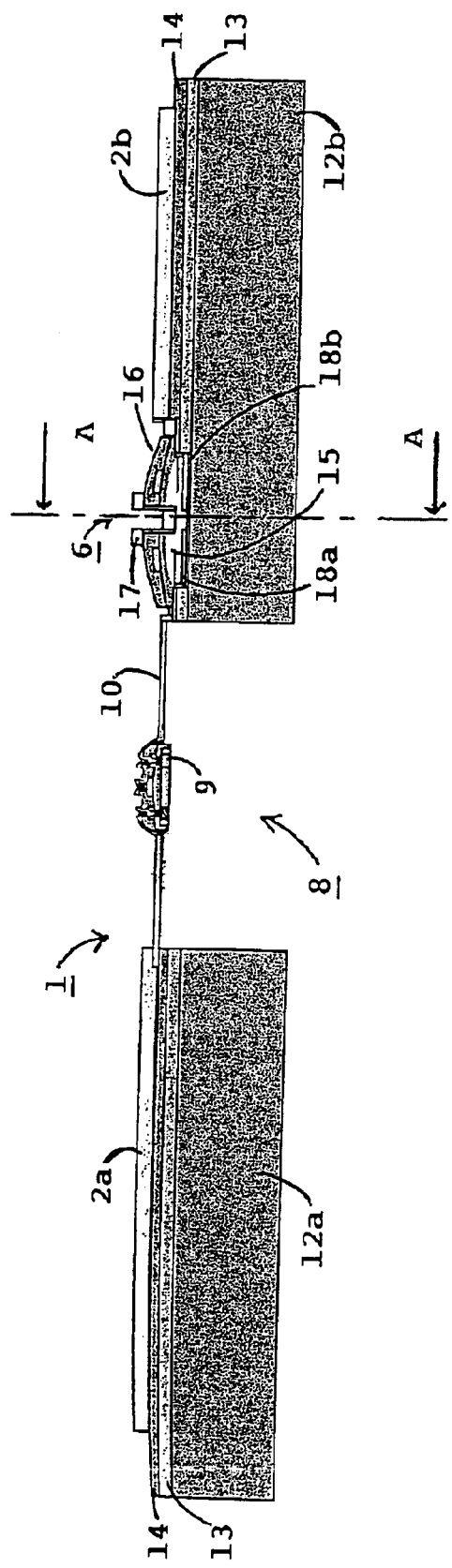
FIG. 3 is a cross-sectional view of a detector according to the invention.

In FIG. 3, the bolometric detector 1 is achieved on a silicon substrate 12 divided into two parts 12a and 12b both designed to support a receiver antenna. The two parts 12a and 12b are separated by the hollow central part 8. The first part 12a is totally covered by a first layer 13 of silicon oxide itself covered by a second layer 14 of epitaxial silicon, the first antenna 2a being arranged on the second layer 14. The second part 12b of the substrate is covered by the first and second layers 13 and 14, wherein a cavity 15 is formed whereon the switch 6 is arranged. The second antenna 2b, arranged on the second layer 14, is adjacent to the switch 6. The latter is thus arranged between the second antenna 2b and the hollow central part 8.

The two parts 12a and 12b of the substrate are connected by the arm 10 forming a beam and supporting the diode 9 above the hollow central 8. A first free end of the arm 10 is arranged between the second layer 14 of the first part 12a of the substrate and the first antenna 2a, whereas the second free end of the arm 10 is connected to a first connection terminal 18a of the switch 6, located at the bottom of the cavity 15. The second antenna 2b is also connected to a second connection terminal 18b of the switch 6, located at the bottom of the cavity 15, so that the first and second connection terminals 18a and 18b are separated by a space of preset width.

Figure 4:
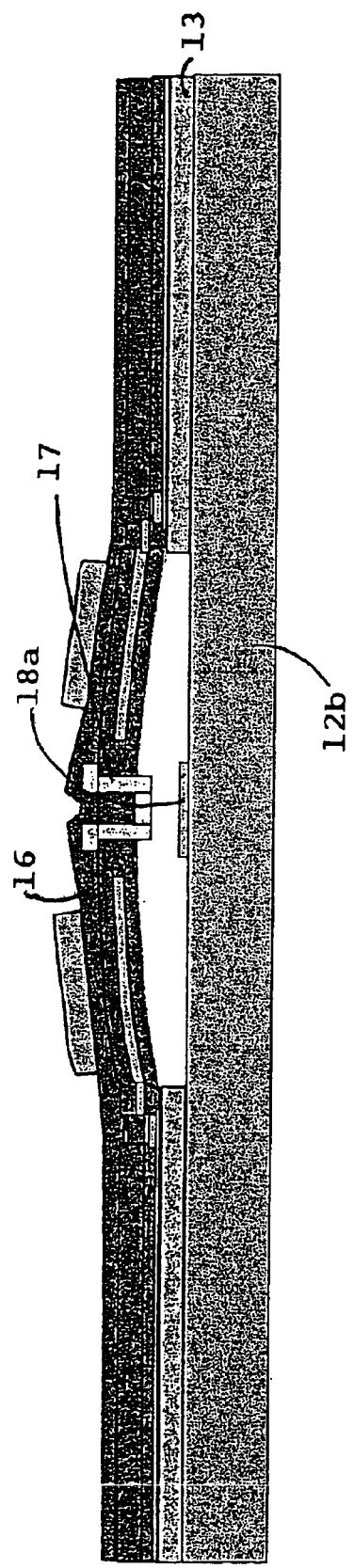
FIGS. 4 and 5 are cross-sectional view along A—A of a switch of the detector according to FIG. 3, respectively open and closed.
Figure 5:
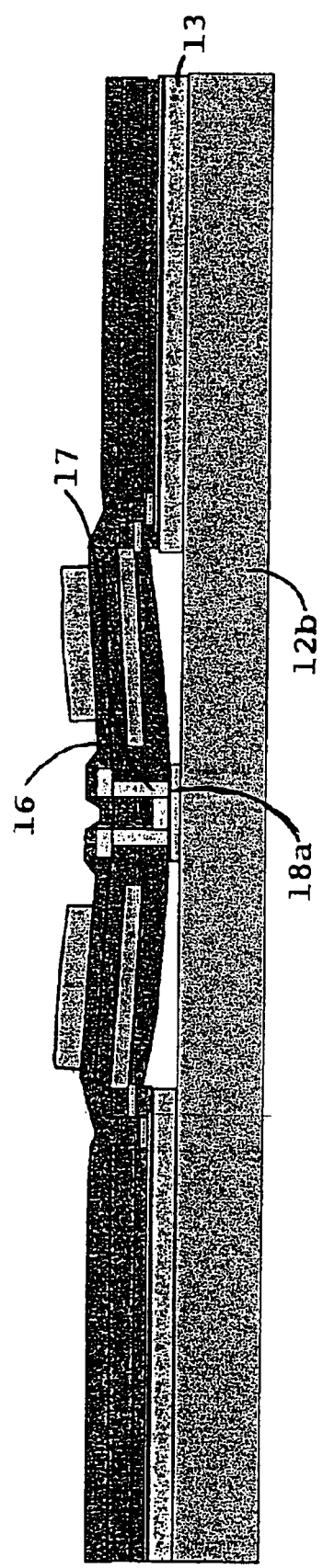

The switch 6 preferably comprises a deformable element 16, attached via its two ends to the first layer 13. The deformable element is naturally convex with respect to the plane of the substrate 12. A conducting stud 17 is provided in the convex part of the deformable element 16, on the same side as the cavity 15. The switching means enable the deformable element 16 to periodically switch from a first state (FIG. 3), corresponding to its naturally convex shape, to a second state (FIG. 4). The second state of the deformable element 16 enables the conducting stud 17 to make the electrical contact between the connection terminals 18a and 18b, and consequently between the second antenna 2b and the metal arm 10. The space comprised between the two connection terminals 18a and 18b is smaller than or equal to the width of the stud 17.

Switching of the switch can be achieved by any known type of means. A bimetal effect thermal actuator, such as the micro-devices with bimetal effect thermal actuator described in the documents FR-A1-2,818,795 corresponding to US-A1-2002097133 and FR-A1-2,772,512, can for example be used to cause periodic opening and closing of the switch. In FIG. 2, the electrodes 7 are formed by coils constituting heating elements.

According to another embodiment, the deformable element 16 is made of magnetic material and a coil is arranged on the substrate 12 so as to cause periodic opening and closing of the switch by means of electromagnetic switching means.

In another alternative embodiment, the stud 17 can be electrostatically attracted by a part of the second antenna 2b.

The use of a switch of the type of those described above enables the electrical signal sent to the resistive load to be modulated, while at the same time presenting the advantage of being integrated in the bolometric detector, thus making the volume occupied by the latter small. As this type of switch is not mechanical, it does not create any vibration troubling operation of the detector and is very dependable.

The switch also enables the very low frequency noise inherent to a pixel to be limited and enables adjustment to be made on the offset voltage fluctuation. It is then not necessary to use an optically shielding screen to eliminate this fluctuation, which presents the advantage of eliminating an embedded mechanical system.

An imagery device comprising at least one bolometric detector such as those described above presents the advantage of detecting objects under difficult conditions, while limiting the low frequency noise generated by the detector. The imagery device can also comprise a matrix of bolometric detectors.

The invention is not limited to the embodiments described above. Several bolometric detectors can be arranged in such a way that their respective diodes are connected in parallel, thus forming a matrix of detectors used in an imagery system enabling the range of wavelengths detected to be broadened.

What is claimed is:

1. Bolometric detector comprising at least one receiver antenna designed to collect electromagnetic waves and extended by a resistive load converting the power of the electromagnetic waves into calorific power, said resistive load being in contact with a thermometric element detecting the temperature rise relating to the calorific power generated, said detector also comprising modulating means, detector wherein the modulating means comprise a switch located between the antenna and the resistive load, control means periodically causing opening and closing of the switch at a preset switching frequency.

2. Bolometric detector according to claim 1, wherein the control means comprise electrostatic switching means.

3. Bolometric detector according to claim 1, wherein the control means comprise thermal switching means.

4. Detector according to claim 3, wherein the thermal switching means comprise a bimetal effect thermal actuator.

5. Bolometric detector according to claim 1, wherein the control means comprise electromagnetic switching means.

6. Bolometric detector according to claim 2, wherein the switch, achieved on a substrate, comprises a deformable element attached via its two ends to the substrate and naturally convex with respect to the latter, a conducting stud, provided on the deformable element, being designed to make the electrical contact between the antenna and the resistive load when the switch is closed, the antenna and the resistive load being achieved on said substrate.

7. Detector according to claim 5, wherein the deformable element being magnetic, the switching means comprise a coil arranged on the substrate.

8. Detector according to claim 1, wherein the switching frequency is lower than the thermal cut-off frequency of the detector.

9. Detector according to claim 1, wherein the thermometric element is a diode.

10. Imagery device comprising at least one bolometric detector wherein the bolometric detector is a detector according to any one of the claims 1 to 9.

11. Imagery device according to claim 10, comprising a matrix of bolometric detectors.

\* \* \* \* \*

UNITED STATES PATENT AND TRADEMARK OFFICE
CERTIFICATE OF CORRECTION

PATENT NO. : 6,891,503 B1
DATED : May 10, 2005
INVENTOR(S) : Olivier Savry and Patrick Agnese It is certified that error appears in the above-identified patent and that said Letters Patent is hereby corrected as shown below:

Column 6,
Line 11, please replace "according to any one of the claims 1 to 9." with
-- according to claim 1. --

Column 6,
After line 13, please add the following claims:
12. Imagry device comprising at least one bolometric detector wherein the bolometric detector is a detector according to claim 2.
13. Imagry device comprising at least one bolometric detector wherein the bolometric detector is a detector according to claim 3.
14. Imagry device comprising at least one bolometric detector wherein the bolometric detector is a detector according to claim 4.
15. Imagry device comprising at least one bolometric detector wherein the bolometric detector is a detector according to claim 5.
16. Imagry device comprising at least one bolometric detector wherein the bolometric detector is a detector according to claim 6.
17. Imagry device comprising at least one bolometric detector wherein the bolometric detector is a detector according to claim 7.
18. Imagry device comprising at least one bolometric detector wherein the bolometric detector is a detector according to claim 8.
19. Imagry device comprising at least one bolometric detector wherein the bolometric detector is a detector according to claim 9.

Signed and Sealed this

Second Day of August, 2005

JON W. DUDAS
*Director of the United States Patent and Trademark Office*